(12) United States Patent
Decker et al.

(10) Patent No.: US 12,314,622 B2
(45) Date of Patent: May 27, 2025

(54) STADIUM DISPLAY SYSTEM

(71) Applicant: FANWEB TECHNOLOGIES, LLC, Sanger, TX (US)

(72) Inventors: Lance Decker, Tomball, TX (US); Bradley Hartman, Katy, TX (US); Daniel Korbelic, Arlington, TX (US); Deandrew Daniel, Aubrey, TX (US); Sherman Wilder, Humble, TX (US); Tyler Culley, Denton, TX (US); Christopher Smith, Sanger, TX (US)

(73) Assignee: FANWEB TECHNOLOGIES, LLC, Sanger, TX (US)

( * ) Notice: Subject to any disclaimer, the term of this patent is extended or adjusted under 35 U.S.C. 154(b) by 34 days.

(21) Appl. No.: 18/458,612

(22) Filed: Aug. 30, 2023

(65) Prior Publication Data

US 2024/0069847 A1 Feb. 29, 2024

Related U.S. Application Data

(60) Provisional application No. 63/402,572, filed on Aug. 31, 2022.

(51) Int. Cl.
*G06F 3/147* (2006.01)
*G06F 3/14* (2006.01)

(52) U.S. Cl.
CPC ............ *G06F 3/1438* (2013.01); *G06F 3/147* (2013.01)

(58) Field of Classification Search
CPC ........... G09G 3/2088; G09G 2300/026; G09G 2356/00; G09G 2360/04; G09G 2370/16; G09G 2370/022; G09G 5/12; G06F 3/1446; G01S 5/0009; H04M 1/72403

See application file for complete search history.

(56) References Cited

U.S. PATENT DOCUMENTS

2015/0012308 A1\* 1/2015 Snyder ................... G06Q 10/02
705/5
2020/0279439 A1 9/2020 Callaghan

FOREIGN PATENT DOCUMENTS

EP 3796151 A1 \* 3/2021 ........... G06F 3/1446

OTHER PUBLICATIONS

International Search Report and Written Opinion for International PCT Patent Application No. PCT/US23/73166 mailed Nov. 20, 2023 (9 pages).

\* cited by examiner

*Primary Examiner* — Nitin Patel
*Assistant Examiner* — Amen W Bogale
(74) *Attorney, Agent, or Firm* — Fox Rothschild LLP; Carol E. Thorstad-Forsyth

(57) ABSTRACT

Systems and methods for controlling a display system. The methods comprise: detecting an occurrence of an event; initiating a display session based on the event being of an event type to trigger a display session; and selecting media content (MC) for display by computing devices (ICDs) (wherein ICDs are located in areas or sections (SA/S) of a venue); selecting a first SA/S at which display of MC is to begin; identifying first CDs (FCDs) that are located in the first SA/S; causing FCDs to notify users that FCDs are to be moved into positions in which first pixel panels are visible by persons located outside of the first SA/S; and causing each FCD to display a respective pixel portion of a first electronic graphic (FEI) contained in MC, whereby an entirety of FEI is displayed collectively by FCDs.

18 Claims, 12 Drawing Sheets

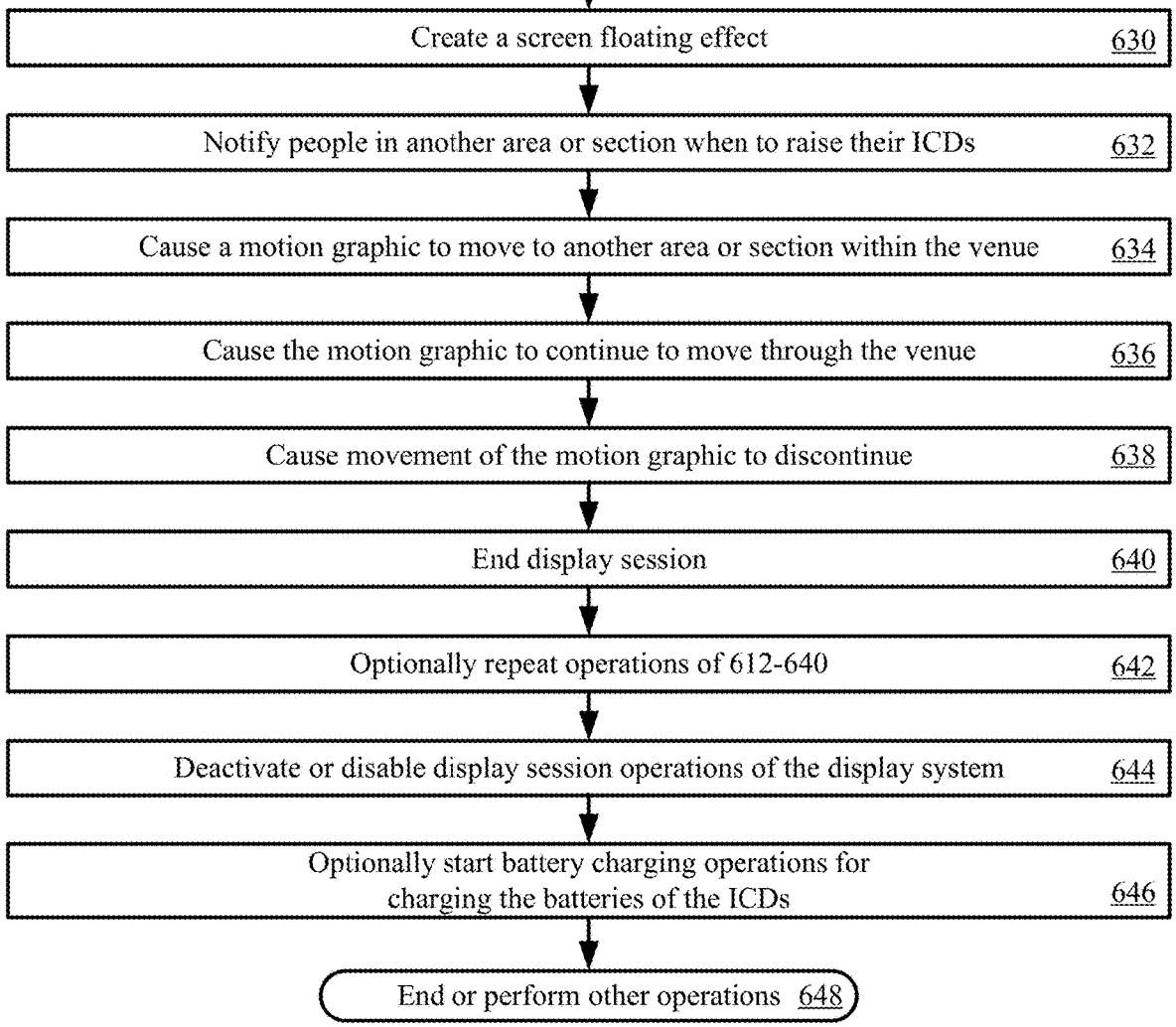

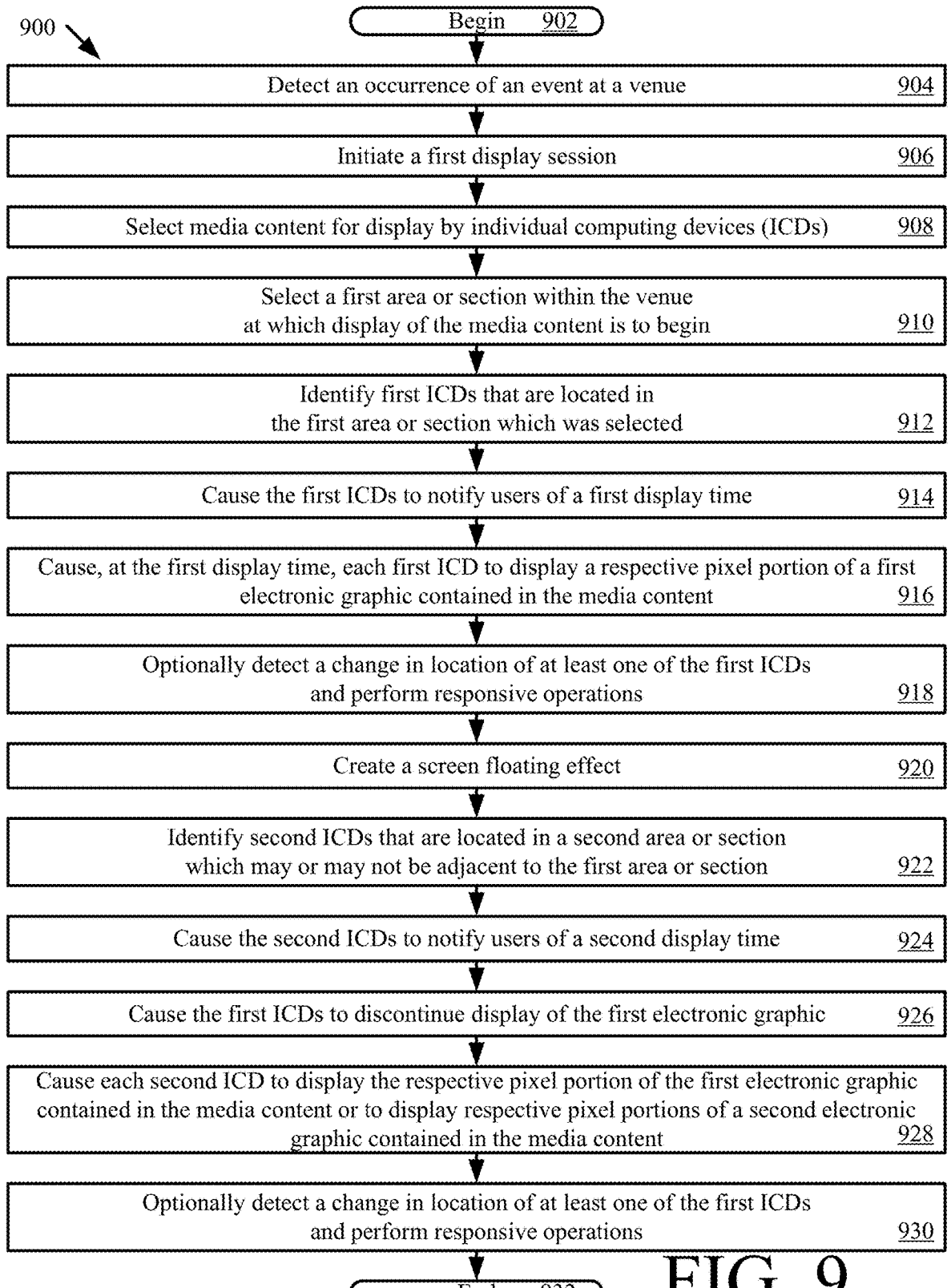

STADIUM DISPLAY SYSTEM

CROSS-REFERENCE TO RELATED APPLICATIONS

The present application claims priority to and the benefit of U.S. Provisional Ser. No. 63/402,572 which was filed on Aug. 31, 2023. The content of the Provisional Application is incorporated herein by reference in its entirety.

BACKGROUND

Description of the Related Art

The related art concerns methods and systems for display systems. Stadiums and other large public venues often include one or more electronic display systems which are used for various purposes. These purposes can include presentation of information concerning an event, entertainment of spectators, cheerleading of one or more teams, and so on. Due to the scale of such venues, the display systems used are often very large so that they may be observed by participants and spectators in the event.

Conventional large scale displays in public venues can create several challenges and their use has certain limitations. For example, since most of the area of a stadium is devoted to spectator seating, certain limitations may arise with regard to the locations where a large conventional display can be located. This can limit the maximum size of the display. It is also important that the display be visible to attendees from all parts of the stadium. But optimizing visibility of the display can also potentially interfere with the ability of spectators to observe the event at the stadium. Finally, conventional display systems suffer from certain limitations insofar as they can display information and graphics, but they do not necessarily engage the spectators directly in the excitement of the event.

SUMMARY

The present document concerns implementing systems and methods for controlling a display system. The methods comprise: detecting an occurrence of an event at the venue; initiating a first display session based on the event being of an event type to trigger a display session; and performing certain operations during the first display session. The certain operations involve: selecting media content for display by a plurality of individual computing devices (wherein the individual computing devices are portable devices and located in a plurality of areas or sections of the venue (e.g., seating and/or standing areas for audience); selecting a first area or section from the plurality of areas or sections within the venue at which display of the media content is to begin; identifying first computing devices of the plurality of individual computing devices that are located in the first area or section which was selected; causing the first computing devices to notify users the first computing devices are to be moved into positions in which first pixel panels are visible by persons located outside of the first area or section; and causing, at a first display time, each one of the first computing devices to display a respective pixel portion of a first electronic graphic contained in the media content, whereby an entirety of the first electronic graphic is displayed collectively by the first computing devices.

The event type to trigger the display session can include, but is not limited to, points being scored by a team, a song being played by a musician or audio system in the venue, a particular sound being detected within the venue, a particular lighting pattern for a show, and/or a particular word or phrase being spoken by a performer entertaining an audience within the venue. The respective pixel portion may comprise a single pixel of the first electronic graphic.

The methods may also comprise: selecting which pixel portion of the first electronic graphic is to be displayed be each of said first computing devices based on relative locations of the first computing devices; and/or creating a screen floating effect by causing the first electronic graphic to appear to move in a given direction (sequentially or non-sequentially) through the plurality of areas or sections.

The methods may additionally or alternatively comprise: identifying second computing devices of the plurality of individual computing devices that are located in a second area or section (which may or may not be adjacent to the first area or section); causing the second computing devices to notify users that the second computing devices are to be moved into positions in which second pixel panels are visible by persons located outside of the second area or section; and performing particular operations at a second display time. The particular operations involve: causing the first computing devices to discontinue display of the first electronic graphic; and causing each one of the second computing devices to display the respective pixel portion of the first electronic graphic contained in the media content or to display respective pixel portions of a second electronic graphic contained in the media content.

The methods may additionally or alternatively comprise: detecting a change in location of at least one of the first computing devices; and causing a different pixel portion of the first electronic graphic to replace the respective pixel portion being displayed by the at least one of the first table computing devices, responsive to detection of the change in location.

The methods may additionally or alternatively comprise: detecting a change in location of at least one of the first computing devices; causing the respective pixel portion to no longer be displayed by the at least one of the first table computing devices, responsive to detection of the change in location; and/or causing the at least one of the first computing devices to display a different pixel portion of the first electronic graphic while second computing devices of the plurality of individual computing devices are displaying all other pixel portions of the first electronic graphic.

The present document also concerns a system comprising: a processor; and a non-transitory computer-readable storage medium comprising programming instructions that are configured to cause the processor to implement a method for controlling a display system. The programming instructions comprise instructions to: detect an occurrence of an event at the venue; initiate a first display session based on the event being of an event type to trigger a display session; and perform certain operations during the first display session. The certain operations comprise: selecting media content for display by a plurality of individual computing devices, wherein the individual computing devices are portable devices and located in a plurality of areas or sections of the venue; selecting a first area or section from the plurality of areas or sections within the venue at which display of the media content is to begin; identifying first computing devices of the plurality of individual computing devices that are located in the first area or section which was selected; causing the first computing devices to notify users that the first computing devices are to be moved into positions in which first pixel panels are visible by persons located outside of the first area or section; and causing, at a first display time, each one of the first computing devices to display a respective pixel portion of a first electronic graphic contained in the media content, whereby an entirety of the first electronic graphic is displayed collectively by the first computing devices.

The event type to trigger the display session may include, but is not limited to, points being scored by a team, a song being played by a musician or audio system in the venue, a particular sound being detected within the venue, a particular lighting pattern for a show, and/or a particular word or phrase being spoken by a performer entertaining an audience within the venue. The respective pixel portion may comprise a single pixel of the first electronic graphic.

The programming instructions may also comprise instructions to: select which pixel portion of the first electronic graphic is to be displayed be each of said first computing devices based on relative locations of the first computing devices; and/or create a screen floating effect by causing the first electronic graphic to appear to move in a given direction through the plurality of areas or sections. Movement of the first electronic graphic can be sequentially or non-sequentially through the plurality of areas or sections.

The programming instructions can additionally or alternatively comprise instructions to: identify second computing devices of the plurality of individual computing devices that are located in a second area or section (which may or may not be adjacent to the first area or section); cause the second computing devices to notify users that the second computing devices are to be moved into positions in which second pixel panels are visible by persons located outside of the second area or section; and performing particular operations at a second display time. The particular operations comprise: causing the first computing devices to discontinue display of the first electronic graphic; and causing each one of the second computing devices to display the respective pixel portion of the first electronic graphic contained in the media content or to display respective pixel portions of a second electronic graphic contained in the media content.

The programming instructions can additionally or alternatively comprise instructions to: detect a change in location of at least one of the first computing devices; and cause a different pixel portion of the first electronic graphic to replace the respective pixel portion being displayed by the at least one of the first table computing devices, responsive to detection of the change in location.

The programming instructions can additionally or alternatively comprise instructions to: detect a change in location of at least one of the first computing devices; cause the respective pixel portion to no longer be displayed by the at least one of the first table computing devices, responsive to detection of the change in location; and/or cause the at least one of the first computing devices to display a different pixel portion of the first electronic graphic while second computing devices of the plurality of individual computing devices are displaying all other pixel portions of the first electronic graphic.

BRIEF DESCRIPTION OF THE DRAWINGS

This disclosure is facilitated by reference to the following drawing figures, in which like reference numerals represent like parts and assemblies throughout the several views. The drawings are not to scale and are intended for use in conjunction with the explanations in the following detailed description.

FIGS. 6A-6B (collectively referred to as "FIG. 6") provides a flow diagram of an illustrative method for operating a display system in accordance with the present solution.

FIG. 9 provides a flow diagram for controlling a display system.

DETAILED DESCRIPTION

Figure 1:
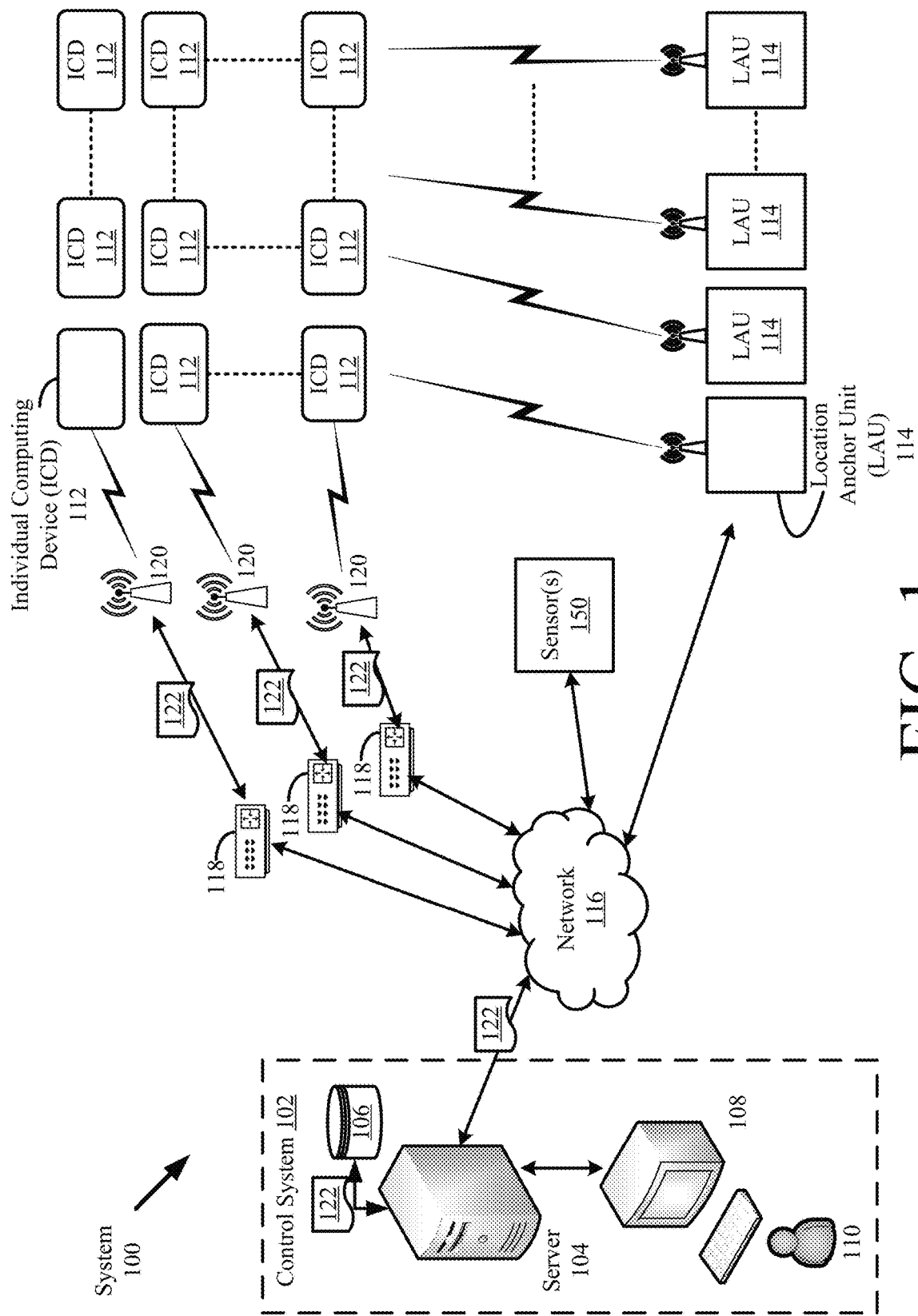
FIG. 1 is a drawing which is useful for understanding a system architecture of a display system described herein.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. Further, particular features described herein can be used in combination with other described features in each of the various possible combinations and permutations. It is noted that various features are described in detail with reference to the drawings, in which like reference numerals represent like parts and assemblies throughout the several views. While the various aspects are presented in the drawings, the drawings are not necessarily drawn to scale unless specifically indicated.

The present solution involves using a plurality of individual computing devices (ICDs) held by a plurality of users to display image content. Briefly, the method involves selecting an action data file and associated image content to be displayed. The action data file and associated image content are then communicated to the ICDs. A control system may optionally cause the ICDs to each obtain or determine their individual locations within a display area relative to locations of other ICDs. Any known or to be known location determining technique can be used herein. The location determining technique can be active (e.g., triangulation) or passive (e.g., pre-determined locations). In some scenarios, the locations of the ICDs are pre-stored in a datastore and accessible to the control system. The ICD locations can be in a look-up table (LUT) format.

The method further involves alerting a user of each ICD. This notification may optionally inform the use of a display time. The display time is an initial time when each ICD is to be presented for viewing together with the plurality of ICDs. At the predetermined display time, each of the ICDs is caused to selectively display a pixel portion of an image comprising the image content. The pixel portion displayed by each ICD is based on the location of each ICD relative to others of the plurality of ICDs.

The methods and/or systems disclosed herein may provide certain advantages for displaying images, graphic art, and video in a public venue. The public venue can include, but is not limited to, a stadium. In the stadium scenarios, the present solution provides for an interactive in-stadium spectator experience at sporting and musical events. Spectators will not only enjoy the experience, but they will become a part of the experience. Each spectator will have a hand-held device. For convenience, each of these devices are individually referred to herein as a ICD. One major side or surface of the ICD consists of a high intensity light display (HILD). A second side of the ICD opposed from the HILD can optionally include grips or handles to allow a spectator to present the HILD so it may be viewed by others. An alerting system (e.g., tactile and/or visible alerts) is included in the ICD for alerting each spectator when their particular ICD should be presented in a way that it can be viewed by others at the event. For example, presentation of the ICD can involve raising the tablet and holding it with the HILD facing away from the user.

The alerts can be triggered upon occurrence of certain events. For example, the alert can be triggered at a sporting event when a goal is scored, at a concert when a certain song is played, and/or any other event deemed to be of significance at the particular event. When the ICDs in a predetermined section of the stands are concurrently triggered, those ICDs will produce an alert signal (e.g., a tactile and/or visible alert) which will concurrently notify spectators in the predetermined section of the stands who are holding those ICDs. In some scenarios, the ICDs can include a visible timer or count down display. The timer or count down display can give the spectators in this particular section some warning of when it will be time to raise their ICDs. For example, the spectators can present their ICDs for display when a counter or timer has reached "zero".

When the ICDs are raised, each individual ICD will act as a single pixel or pixel portion of a larger image or video. When all of the ICDs in a particular section of the stadium are raised concurrently, the pixels of the individual ICDs can combine to form a still or moving graphic displayed across all the raised the ICDs in the particular section. The still or moving graphic can travel sequentially, non-sequentially, randomly or in any other manner through areas and/or sections.

The ICDs in different spectator sections of the stadium can be synchronized so that displayed images subsequently display in ICDs of a next spectator section of the stadium. For example, after the ICDs in a first section of the stadium are activated, the ICDs in a second section of the stadium (which may or may not be adjacent to the first section) may also be activated. Consequently, the display created in the first section can be extended or appear to move to the second section. In such a scenario, the spectators in the second section may be alerted to raise their ICDs as the motion graphics start to move from the first section to the second section. This technique can be used with further adjacent sections of the stadium to create the appearance of a floating screen that will move across all or part of the stadium.

Each ICD may include sufficient electronic hardware and software so that it will be capable of knowing its location with respect to the stadium and the other ICDs around it. With each ICD knowing its location in this way, the motion graphics can be accurately controlled to ensure that the proper pixel data is displayed on each HILD. If ICDs are moved or swapped between spectators in different seats or rows of the stadium, the new ICD location can be determined and updated in the system. The ICD location tracking allows the system to precisely control each HILD to ensure that the overall image created by a section of ICDs is presented correctly. The accurate location of each device for this purpose may be facilitated using a wireless location technology. Ultra-Wide Band (UWB) technology, which has centimeter scale accuracy, can be used for this purpose. A control algorithm can use the UWB technology to determine each device's relative location in relation to the surrounding ICDs.

Referring now to FIG. 1, there is provided an illustration for a display system 100. Display system 100 includes a control system 102. The control system 102 is comprised of a server 104, a datastore 106 and a terminal 108 which may include a computer keyboard. The terminal 108 facilitates a control interface for a control operator 110 to control the operation of the display system 100 as described herein.

The display system 100 also includes ICDs 112 and location anchor units (LAUs) 114. The ICDs may optionally comprise a relatively small number of ICDs (e.g., 8 or fewer ICDs) but the operation of the system is most advantageously facilitated when the number of ICDs is greater than this amount. In fact, it is advantageous for a multiplicity of ICDs to be used in some scenarios. For example, the number of ICDs used in the display system 100 in a particular scenario can be 50, 100, 1000, 10,000, or 100,000 ICDs, without limitation. The number of LAUs can depend on the size of the particular venue where the display system 100 is deployed.

Each individual ICD can function to display a single pixel of a larger image or video displayed by a plurality of ICDs. However, the solution is not limited in this regard and in other scenarios each ICD can display a plurality of pixels comprising a larger image which is displayed using a plurality of ICDs. In still other scenarios, a plurality of ICDs can be used to display a single pixel of a larger image, such that each ICD only displays a portion of a pixel. The selection of how many pixels are displayed on a single ICD can depend in part on the desired image resolution and the number of ICDs that are available to form the image.

Server 104 communicates with the ICDs 112 through network 116 using sectional router(s) 118 and wireless access point(s) 120. Network 116 can include, but is not limited to, the Internet, Intranet, and/or a telecommunications network. Server 104 may communicate with the ICDs 112 using a wide area wireless network facilitated by sectional router(s) 118 and wireless access point(s) 120. The wide area wireless network may extend throughout a display area (e.g., a public venue such as stadium) in which the system 100 is used.

The LAUs 114 are advantageously distributed in selected locations of the public venue and facilitate a locating system whereby the precise locations of the ICDs 112 can be wirelessly determined with a high degree of precision. The specific location detecting system used for this purpose is not critical provided that it facilitates detection of a location of each ICD 112 with a high degree of accuracy. As such, any suitable locating system now known or known in the future can be used for this purpose. For example, the LAUs 114 can (in conjunction with the ICDs 112) implement a locating system using commercially available UWB wireless technology. Such UWB wireless technology can provide centimeter scale location accuracy that may be used to determine a location of each ICD 112 with a high degree of accuracy. A control algorithm used in conjunction with the UWB technology can allow a precise determination of each ICD's location in the public venue, and in relation to the surrounding ICDs 112. The control algorithm can be implemented by server(s) 104, ICD(s) 112 and/or LAU(s) 114.

An illustrative architecture for a ICD 200 is provided in FIG. 2. The present solution is not limited to the particulars of the architecture shown. The ICD 200 can include more or less components, and/or other aesthetic designs. Each of the ICDs 112 of FIG. 1 can be the same as or similar to ICD 200. Thus, the discussion of ICD 200 is sufficient for understanding ICDs 112.

ICD 200 is configured to: (i) display a single pixel of a larger image or video displayed by a plurality of ICDs; (ii) display two or more pixels comprising a larger image which is displayed using a plurality of ICDs; and/or (iii) display a portion of a pixel of a larger image which is displayed using a plurality of ICDs. The selection of how many pixels are displayed on the ICD 200 can depend in part on the desired image resolution and the number of ICDs that are available to form the image. Similarly, the portion of the pixel which is to be displayed on the ICD 200 can depend in part on the desired image resolution and the number of ICDs that are available to form the image.

Figures 2A, 2B:
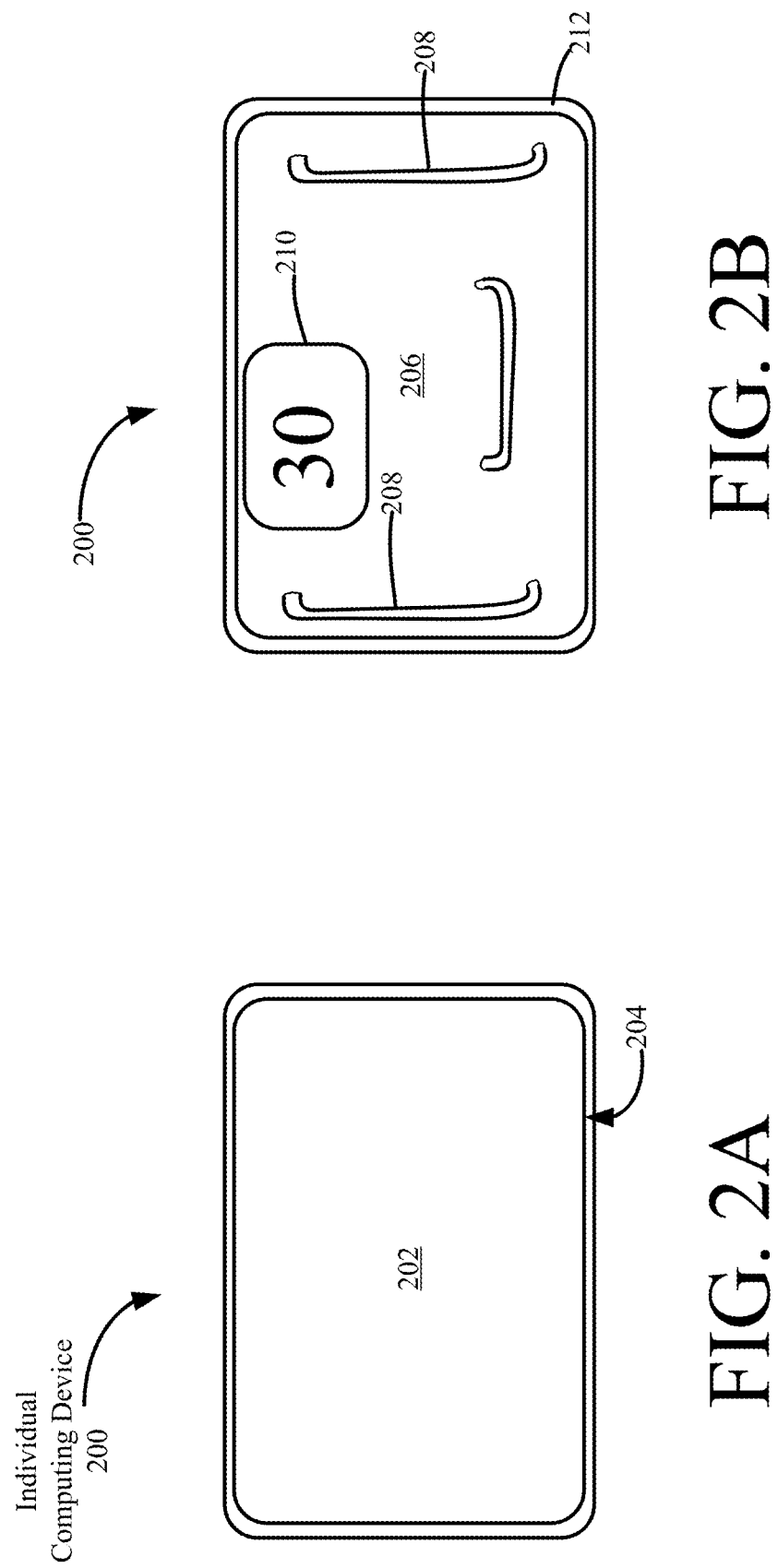
FIGS. 2A-2B (collectively referred to herein as "FIG. 2") provide illustrations of an illustrative computing device.

To facilitate such display, the ICD 200 comprises a pixel panel 202 as shown in FIG. 2A. Pixel panel 202 extends for substantially an entirety of a major surface of the ICD comprising the front side 204 of the ICD. The pixel panel 202 can include, but is not limited to, a HILD. The HILD may be configured so that it can entirely illuminate in any color that is specified by a control system (e.g., control system 102 of FIG. 1). To facilitate such illumination, the HILD can be comprised of one or more light emitting diodes (LEDs) (not shown). LEDs are advantageous in this configuration because of their ability to produce brightly colored light in a package that is light weight with relatively low power consumption. However, the present solution is not limited in this regard and any other illumination technology can be applied for this purpose provided that it is capable of producing light of various colors and sufficient brightness.

A rear surface 206 of the ICD 200 is shown in FIG. 2B. Gripping handles 208 can be provided to facilitate presentation of the ICD 200 for displaying a part of an image as hereinafter described. Such presentation may be by a spectator or other user in a public venue. For example, presentation of the ICD 200 can include holding up the ICD so that content of the pixel panel 202 may be observed by others as part of a larger displayed image in the public venue. A digital display 210 can be provided to present certain timing information which is used to facilitate operation of the ICD and/or display system (e.g., display system 100 of FIG. 1). The purpose of the digital display 210 will become more apparent as the discussion progresses. An alerting system 212 can be provided and used to alert a user as to a time when the ICD 200 will be active as part of the larger display device for displaying content (e.g., an image). The alerting system 212 can include, but is not limited to, a light bar, tone generator, and/or a vibrator.

Figure 3:
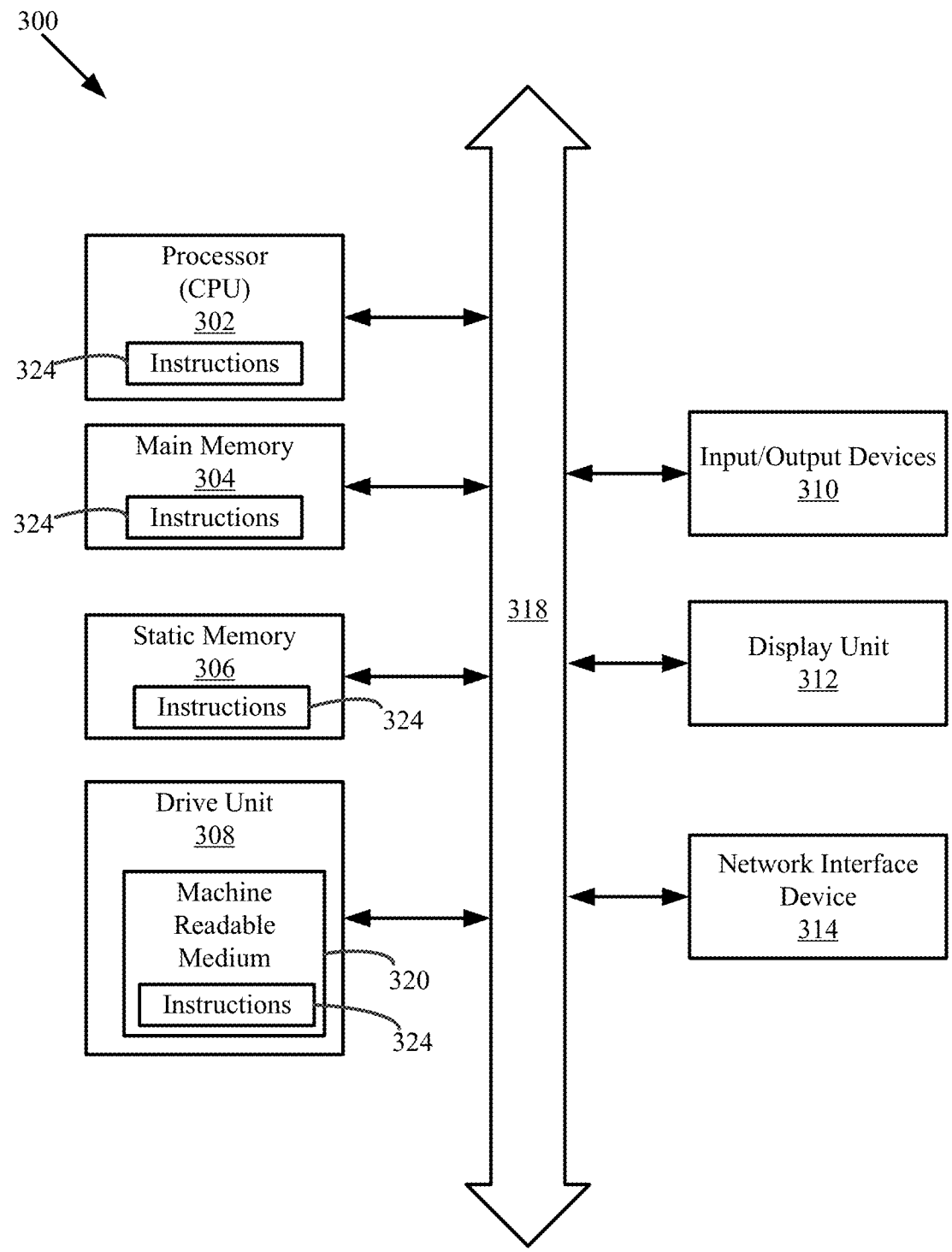
FIG. 3 is a block diagram of a computer system that can perform certain processing operations as described herein.

An illustration of a computing device 300 is provided in FIG. 3. Server 104 of FIG. 1, ICDs 112 of FIG. 1, LAUs 114 of FIG. 1 and/or ICD 200 of FIG. 2 can be the same as or similar to computing device 300. Thus, the discussion of computing device 300 is sufficient for understanding devices 104, 112, 114, 200 of FIGS. 1-2.

Computer device 300 can comprise various types of computing devices, including a server computer, a tablet computer or any other similar electronic device capable of executing a set of instructions (sequential or otherwise) that specifies actions to be taken by that device.

Computing device 300 can comprise one or more components such as a processor, an application specific circuit, a programmable logic device, a digital signal processor, or other circuit programmed to perform the functions described herein. Each of these devices can be realized as one computer system or several interconnected computer systems. Any kind of computer system or other apparatus adapted for carrying out the methods described herein is suited. In this regard, computer device 300 comprises a set of instructions 324 configured to cause the computer system to perform any one or more of the methodologies discussed herein.

Computer device 300 can include more or less components than that shown in FIG. 3. Computer device 300 can operate independently as a standalone device or operate as a part of a distributed system. In the distributed scenario, computer device 300 can be operatively connected (networked) to other machines in a distributed environment to facilitate certain operations described herein. Accordingly, while only a single machine is illustrated in FIG. 3, it should be understood that computing device 300 can be taken to involve any collection of machines that individually or jointly execute one or more sets of instructions as described herein.

As shown in FIG. 3, computer device 300 comprises a processor 302 (e.g. a central processing unit or CPU), a main memory 304, a static memory 306, a drive unit 308 for mass data storage, input/output devices 310, a display unit 312 (e.g., a liquid crystal display (LCD), a solid state display, or a cathode ray tube (CRT)), and a network interface device 314. Communications among these various components can be facilitated by means of a data bus 318. One or more sets of instructions 324 can be stored completely or partially in one or more of the main memory 304, static memory 306 and drive unit 308. The instructions 324 can also reside within the processor 302 during execution thereof by the computer device 300. The input/output devices 310 can include, but are not limited to, a keyboard, a mouse, and/or a multi-touch surface (e.g., a touchscreen). The network interface device 314 can be comprised of hardware components and software or firmware to facilitate wired or wireless network data communications in accordance with a network communication protocol utilized by a network (e.g., network 116 of FIG. 1).

Drive unit 308 can comprise a machine readable medium 320 on which is stored one or more sets of instructions 324 (e.g., software) which are used to facilitate one or more of the methodologies and functions described herein. The term "machine-readable medium" shall be understood to include any tangible medium that is capable of storing instructions or data structures which facilitate any one or more of the methodologies of the present disclosure. Machine-readable media can include, for example, magnetic media, solid-state memories, and/or optical-media. More particularly, tangible media as described herein can include, but are not limited to, magnetic disks, magneto-optical disks, CD-ROM disks, DVD-ROM disks, semiconductor memory devices, electrically erasable programmable read-only memory (EEPROM), and/or flash memory devices. A tangible medium as described herein is one that is non-transitory insofar as it does not involve a propagating signal.

Computer device 300 should be understood to be one possible example of a computer device which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits (ASICs), programmable logic arrays (PLAs), and other hardware devices can likewise be constructed to implement the methods described herein. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, computing device 300 is applicable to software, firmware, and hardware implementations.

Further, it should be understood that the present solution can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 4:
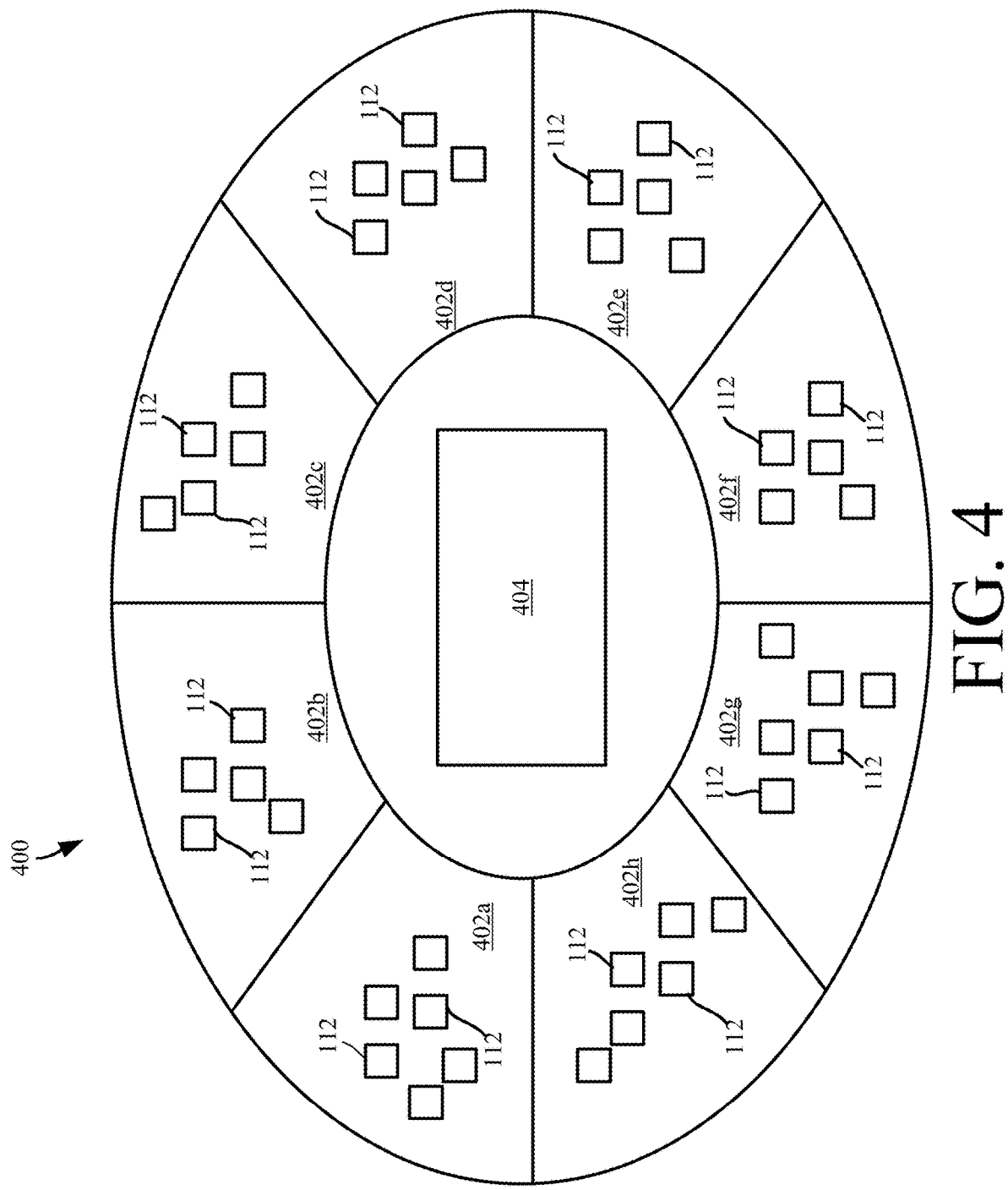
FIGS. 4-5 provided illustrations that are useful for understanding how the display system of FIG. 1 can be deployed and used in a public venue.

FIG. 4 provides an illustration that is useful for understanding the operation of the display system 100 in a large public venue 400. Public venue 400 can include, but is not limited to, a stadium. Public venue 400 comprises spectator seating sections 402a, 402b, 402c, 402d, 402e, 402f, 402g, 402h which are distributed peripherally around a central event area 404. Although eight spectator seating sections are shown in FIG. 4, the present solution is not limited in this regard. Any number of spectator seating sections can be present in accordance with a given application. People can be seated within each of the seating sections 402a-402h. The people can include, but are not limited to, spectators or other individuals. Further, one or more persons in the seating section(s) 402a-402h can be provided with a ICD 112 as described herein.

Figure 5:
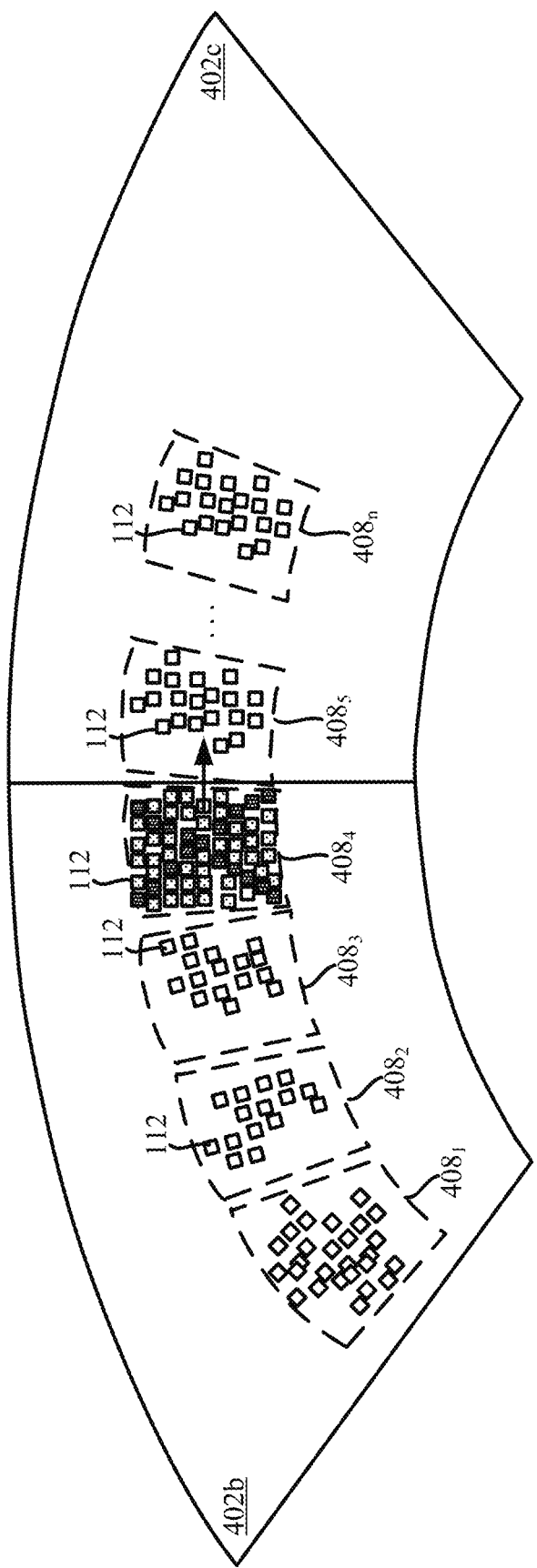

FIG. 5 is useful for understanding how people use the ICDs 112 to form individual pixels of a larger image which can be observed by others in the public venue 400. An alerting system 212 (e.g., a tactile and/or visible alerting system) is included in each ICD 112 for alerting the user when his(her) particular ICD should be presented in a way that its pixel panel 202 can be viewed by other persons at the public venue 400. For example, presentation of the ICD 112 can involve raising the ICD and holding it with the pixel panel 202 facing away from the user.

By controlling the pixel panel 202 of each ICD 112, the larger graphic can be created collectively by a plurality of pixel panels which is observable by other persons present at the public venue 400. For example, as shown in FIG. 5, some of the ICDs 112 located a seating area $408_4$ of spectator seating section 402b are actively displaying a letter X in a first color (e.g., blue). Other ICDs 112 in seating area $408_4$ are displaying a different color (e.g., red) to provide a contrasting background for the letter X.

In some scenarios, only the ICDs in a single seating area $408_1$, $408_2$, $408_3$, $408_4$, $408_5$ or $408_N$ may be active at a given time. However, in other scenarios, the ICDs in multiple seating areas can be active at the same time. For example, the letter X can appear to smoothly move across the spectator seating areas $408_1$-$408_n$ and/or spectator seating sections $402_1$-$402_n$ by coordinating the operation of the ICDs in each adjacent spectator seating area and/or section.

In some scenarios, ICDs in adjacent spectator seating areas $408_1$-$408_n$ and/or spectator seating sections $402_1$-$402_n$ may be active as the image transitions from one area/section of seating to the next area/section of seating. In those or other scenarios, the ICDs in adjacent spectator seating areas $408_1$-$408_n$ and/or spectator seating sections $402_1$-$402_n$ may be active at the same time with an initial state having a first color (e.g., a background red). The display color of some ICDs can then be changed (e.g., to blue, black, etc.) so that the letter X is presented thereby. The color of the ICDs can be changed so that the letter X appears to be moving in an upward, downward, leftward and/or rightward direction(s) through the spectator seating areas $408_1$-$408_n$ and/or spectator seating sections $402_1$-$402_n$. The present solution is not limited to the particulars of these examples and scenarios.

The alerts for each ICD can be triggered by the control system 102 of FIG. 1 upon occurrence of certain events. For example, an alert can be triggered at a sporting event when a goal is scored, at a concert when a certain song is played, or any other event deemed to be of significance at the particular event. When the ICDs 112 in a predetermined portion of the public venue (e.g., seating area(s)) are concurrently triggered, those ICDs will produce an alert signal which will concurrently notify users in that portion of the public venue. The notification can be provided to, for example, give the users in a particular portion of the public venue an indication and/or warning of when it will be time to raise their ICDs. For example, the timer can be initially set to display some time value (e.g., M or N seconds) and users can thereby be prompted to present their ICD 112 for display when the counter or timer has decremented from N (e.g., 30) to M (e.g., 0) or incremented from M to N. M and N may be any integer numbers. The present solution is not limited to the particulars of these examples.

For example, in FIG. 5, spectators in seating area $408_1$ can be notified to present their ICD 112 for display. At a first subsequent time, spectators in seating area $408_2$ are notified to present their ICD 112 for display. At a second subsequent time after the first subsequent time, spectators in section $408_3$ are prompted to present their ICD for display. The process continues in this way for seating areas $408_4$ through $408_n$ until the display session is complete. In this process, each individual ICD 112 will act as a single pixel of a larger image or video. When all or most of the ICDs 112 in a particular portion of the seating area or venue section are raised concurrently as a group, the pixels of the individual ICDs can combine to form a still or moving image which can be observed by other persons in the public venue.

The ICDs 112 in different sections can be synchronized so that displayed images subsequently display in ICDs of a next spectator section to produce a kind of rolling display that transitions through the seating sections 402a-402h comprising the public venue 400. For example, after the ICDs 112 in a first section of a stadium seating area are activated, the ICDs in a second section of the stadium seating area (which may be adjacent to the first section) may also be activated. Consequently, the display created in the first section can be extended or appear to move to the second section. In such a scenario, the spectators in the second section may be alerted to raise their ICDs 112 as the motion graphics start to move from the first section to the second section. This technique can be used with further adjacent sections of the stadium seating area to create the appearance of a floating screen that will move across all or part of the stadium. The control over all the ICDs is facilitated by the control system 102 of FIG. 1 and the ICDs themselves based on the location of each ICD.

According to one aspect, each ICD 112 will include sufficient electronic hardware and software so that it will be capable of knowing its location with respect to the public venue and the other ICDs around it. With each ICD 112 knowing its location in this way, the motion graphics can be accurately controlled to ensure that the proper pixel data is displayed on each HILD. If ICDs 112 are moved or swapped between individuals in different seats or rows of the venue, the new ICD location can be determined and updated in the system. The ICD location tracking allows the system to precisely control each pixel panel to ensure that the overall image created by a section of ICDs 112 is presented correctly. In some scenarios, the accurate location of each device for this purpose can be facilitated using a wireless location technology. UWB technology (which has centimeter scale accuracy) may be used for this purpose. A control algorithm will use the UWB technology to determine each device's relative location in relation to the surrounding ICDs 112, LAUs 114, routers 118, spectator seating areas $408_1$-$408_n$ and/or spectator seating sections $402_1$-$402_n$.

The present solution is not limited to the particulars of FIGS. 4-5. The display system 100 is configured to cause the electronic graphic to move clockwise (as shown in FIG. 5) through seating areas/sections, counter clockwise (not shown) through seating areas/sections, randomly through seating areas/sections, and/or two or more times through seating areas/sections. The electronic graphic can also be made to appear in some or all of the through seating areas/sections at any given time.

Figure 6A:
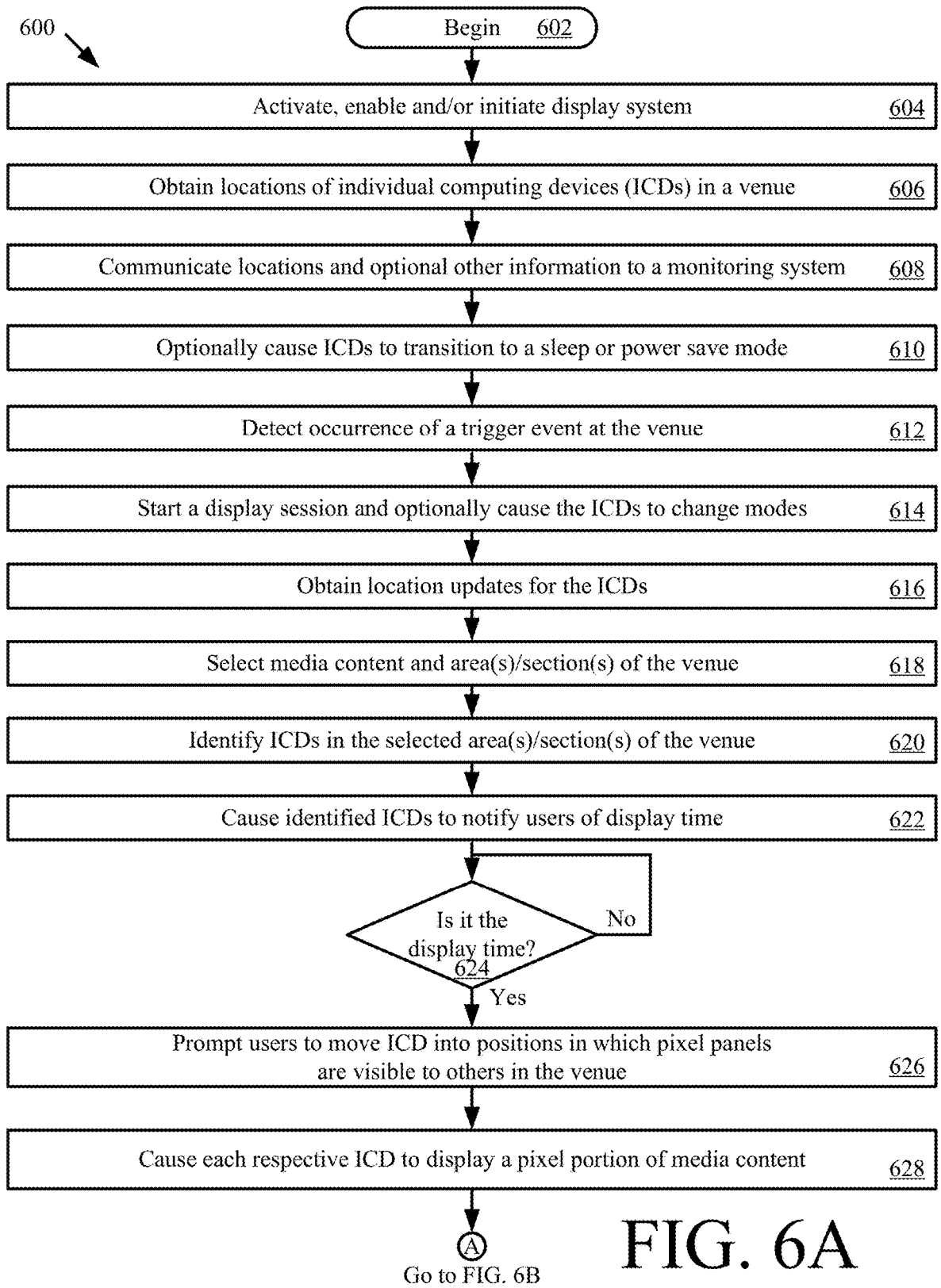

FIG. 6 provides a flow diagram of a method 600 for operating a display system (e.g., display system 100 of FIG. 1) in accordance with the present solution. Method 600 begins with 602 and continues to 604 where the display system is activated, enabled and/or initiated. This operation can be facilitated by a user-software interaction of a control system operator (e.g., individual 110 of FIG. 1) at a given time. The time may be a time before an event begins at a particular venue (e.g., public venue 400 of FIG. 4).

Next in 606, operations are performed by ICDs (e.g., ICDs 112 of FIG. 1) to obtain their locations. Any known or to be known technique for determining device locations can be used here without limitation. For example, UWB technology may be used to determine the locations of the ICDs inside the venue (e.g., stadium). The locations are communicated in 608 from the ICDs to a monitoring system. Other information may also be communicated along with the locations. This other information can include, but is not limited to, battery status(es) and/or communication status(es). The monitoring system can include one or more LAUs (e.g., LAUs 114 of FIG. 1) with or without a bird's-eye view of the venue. The LAUs may communicate the ICD locations to the control system (e.g., control system 102 of FIG. 1) via a network (e.g., network 116 of FIG. 1).

In 610, the ICDs are optionally caused by a control system (e.g., control system 102 of FIG. 1) to transition to their sleep mode or power save mode. Some operations of each ICD may be disabled in the sleep or power save mode to, for example, preserve battery life for those periods of time when the ICD is not actively being used. These operations can include, but are not limited to, display operations, alert operations, and other non-communication related operations. Communication related operations can include, but are not limited to, operations for generating signals to be transmitted from the ICD, wirelessly transmitting and receiving signals, processing received signals, and controlling local electronic components in accordance with commands in received signals.

In 612, the display system detects the occurrence of a trigger event at the venue. This detection can be achieved using sensor data and/or data received from other electronic systems or devices at the venue. The sensor data can include, but is not limited to, images, videos, and/or captured sound. The other electronic systems and devices can include, but are not limited to, camera(s), jumbotron(s), audio system(s), wireless referee communication system(s), and/or computing device(s). Any known or to be known technique for detecting an event can be used here. For example, a trigger event can be detected via image-based object detection and/or word recognition from captured sound. Additionally or alternatively, the trigger event can be detected simply based on user-software interaction for inputting information indicating that a trigger event occurred into the control system (e.g., control system 102 of FIG. 1), and/or based on content of a received message notifying the display system that a particular type of trigger event has occurred, is currently occurring, or is to occur in the future at a given time. The trigger event can include, for example, any event for which a display session is deemed to be appropriate for the display system 100. Such trigger events can include, but are not limited to, the scoring of a goal by a sports team, and/or a playing of a particular song at a music concert.

When such a detection is made, method 600 continues with 614 where the control system performs operations to start a display session and optionally cause the ICDs to transition from their current mode (e.g., sleep or lower power modes or an at least partially deactivated mode) to an activated mode in which they can be remotely controlled by the control system during the display session for displaying images, videos or other content as discussed herein. Operations are performed in 616 to obtain any location updates for the ICDs. These operations can be the same as or different than those performed in relation to blocks 606 and 608. For example, in block 616, the control system can initiate a system location update which causes each ICD to determine its present location and communicate the same to the LAUs in preparation for a display session.

In block 618, operations are performed to manually or automatedly select (i) an image, video or motion graphic for display by the ICDs and (b) a particular area (e.g., area $408_1$, $408_2$, $408_3$, $408_4$, $408_5$ or $408_n$ of FIG. 5) and/or section (e.g., section 402a, 402b, 402c, 402d, 402e, 402f, 402g or 402h of FIG. 4) at which the display is to begin. The manual selection can be made by an individual (e.g., controller 110 of FIG. 1) using a graphical user interface (GUI) displayed by a computing device (e.g., computing device 108 of FIG. 1) of the display system. The automated selection can be made by a server (e.g., server 104 of FIG. 1) or other computing device, for example, using a look-up table (LUT) that contains event type identifiers respectively associated with media content names and/or electronic addresses where media content is stored in a datastore (e.g., datastore 106 of FIG. 12). The media content can include image(s), video(s) and/or motion graphic(s). The media content may be included as part of an action file (e.g., an action file 122 of FIG. 1).

In block 620, the control system identifies the ICDs which are located in the area(s) and/or section(s) of the venue which were selected in 618. The control system then performs operations in 622 to cause the identified ICDs to alert or otherwise notify their users of a display time. The alert or notification can be a tactile, auditory and/or visual alert or notification. For example, the alert or notification can include vibration of the device and the start of a counter reflecting the amount of time until the display time (e.g., 30 seconds). The counter can be presented on the pixel panel (e.g., pixel panel 202 of FIG. 2) or output via another output device (e.g., digital display 210 of FIG. 2) of the ICD. The display time is an initial time when each of the identified ICDs is to be presented for viewing together with the other identified ICDs. It should be noted that ICDs in different areas/sections can have the same or different display times in accordance with a given application.

At a display time, each user of a respective ICD is prompted to raise the device such that the pixel panel (e.g., pixel panel 202 of FIG. 2) is visible by other persons in the venue, as shown by blocks 624 and 626. The prompt can be, for example, by outputting the word "up" from an output device of the ICD (e.g., digital display 210 of FIG. 2). This word can mean that the user is to raise his(her) ICD for viewing by others at the venue. In 628, the respective ICDs are caused to display a pixel portion of media content (e.g., an image) via their pixel panels. The respective ICDs referenced here are those ICDs associated with the particular display time. The pixel portion displayed by each respective ICD is based on the location of the same relative to other ones of the respective ICDs. Upon completing the operations of block 628, method 600 continues to block 630 of FIG. 6B.

As shown in FIG. 6B, block 630 involves creating a screen floating effect. More specifically, as people in each area or section of the venue are prompted to raise their ICDs, a screen floating effect is created which is similar to that of a single large floating or moving display screen spread across the spectator area(s)/section(s). In 632, people in another area or section of the venue are notified when to lift their ICDs. Next, the motion graphic or video is caused to move in a particular direction within the venue using the ICDs located in the another area or section, as shown by block 634. The motion graphic or video is caused to continue to move through the venue in block 636. This can be achieved by repeating the operations of blocks 632 and 634 so that each person helps create a large moving screen within the venue.

At some point, movement of the motion graphics is discontinued and the display session is ended as shown by blocks 638 and 640. For example, movement of the motion graphics can be discontinued after a pre-determined number of passes through the venue seating areas. Alternatively, an operation can cause such discontinuation via user-software interactions with the control system.

Operations of blocks 610-640 can be repeated any number of times during an event (e.g., a sports event or concert). The same or different media content can be presented by the TUCs responsive to detection of another trigger event at the venue.

When the event (e.g., sports event or concert) is completed, operations are performed in 644 by the control system to deactivate or disable at least display session operations of the display system. For example, the ICDs are caused to transition back into their sleep or power save modes. Additionally or alternatively, the control system can detect when an unauthorized graphic is being displayed by the ICDs and override the display operations of the ICDs responsive to such detection. Battery charging operations can be started in block 646. The battery charging operations can involve activating battery charging operation of docking station(s) in which the ICDs are stored and/or activating energy harvesting circuit operations of the TUCs. Any known or to be known energy harvesting circuits can be used here.

Figure 7:
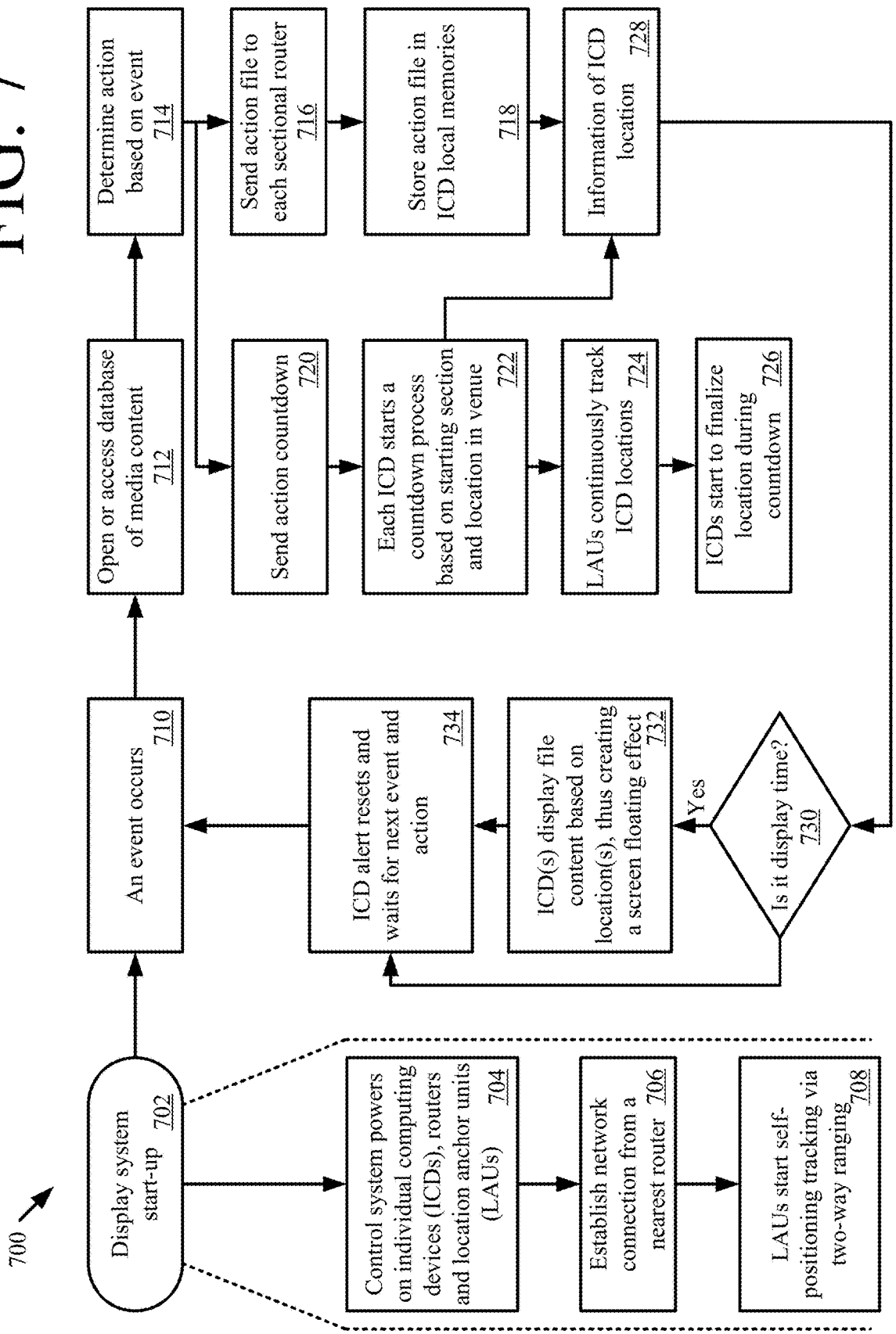
FIG. 7 provides a diagram that is useful for understanding certain operations associated with controlling the display system.

FIG. 7 provides a flow diagram of another method 700 for operating a display system (e.g., display system 100 of FIG. 1) in accordance with the present solution. Method 700 begins with 702 where the display system start-up occurs. The start-up operations can involve operations of blocks 704-708 which may be performed by the control system (e.g., control system 102 of FIG. 1). The operations of blocks 704-708 involve: powering on the ICDs (e.g., ICDs 112 of FIG. 1), routers (e.g., routers 118 of FIG. 1) and LAUs (e.g., LAUs 114 of FIG. 1); establishing a network connection from a nearest router; and powering up the LAUs used to facilitate ICD location operations.

When an event occurs at 710, the control operator (e.g., individual 110 of FIG. 1) of a server (e.g., server 104 of FIG. 1) can open a datastore (e.g., datastore 106 of FIG. 1) or otherwise access media content (e.g., static images, moving graphics, and/or videos) that are stored in a datastore. The control operator at 714 will select particular media content (e.g., a static image, a moving image graphic, or a video) that is appropriate or corresponds to a particular event occurrence.

An action file (e.g., action file 122 of FIG. 1) is associated with the image content. In some scenarios, the action file can comprise the media content and information specifying how the media content is to be displayed at ICDs located in various sections of the venue (e.g., public venue 400 of FIG. 4). At block 716, the action file is communicated from the control system to one or more of the sectional routers associated with each section of the venue and distributed to the ICDs. The routers pass the action file to the ICDs. The action file is stored in a local datastore of the ICDs, as shown by block 718.

In 720, the control system can also initiate a ICD presentation action countdown at 720. This will trigger each ICD to start at 722 a countdown process as described herein based on the time when the media content (e.g., image, moving graphic, or video) is to be presented in each particular section area of the venue.

As preparations are being made for the actual display of the media content in steps 702-722, the LAUs can continuously track the location of each of the ICDs as shown by block 724. As the timers on the ICDs increment or decrement towards the display time, the ICDs start to finalize their location at 726. For example, each ICD can work with LAUs using location sensing technology to establish a final estimate of where such ICD is located in the venue's seating area or section.

At block 728, a final location is established for the ICD which uses the action file (together with its location) to determine what will be presented on the pixel panel (e.g., pixel panel 202 of FIG. 2) at display time (e.g., when the ICD timer reaches zero). At 730, a determination is made as to whether it is display time (e.g., the ICD timer has reached zero).

If so [730:YES], then the ICD(s) will display the file content in accordance with the location(s) it(they) has(have) determined for itself(themselves). Note that since each ICD can comprise a single pixel of an image, the ICD may display a single color for the duration of the display session beginning at the display time. Alternatively, the color of the pixel can change during the period of the display session to facilitate presentation of a moving image. In other scenarios, the particular ICD may have a dark screen (i.e., the screen may be black or turned off) to represent dark areas of an image. In still other scenarios, the screen of a particular ICD can be subdivided to display a limited plurality of pixels (e.g., 2, 4 or 8 pixels) of a much larger image being displayed by a multiplicity of ICDs in a particular area/section of the venue.

At 734, the ICD alert resets (e.g., a timer resets) as it waits for the next display session to begin based on an occurrent of another event and receipt of another action file.

Figure 8A:
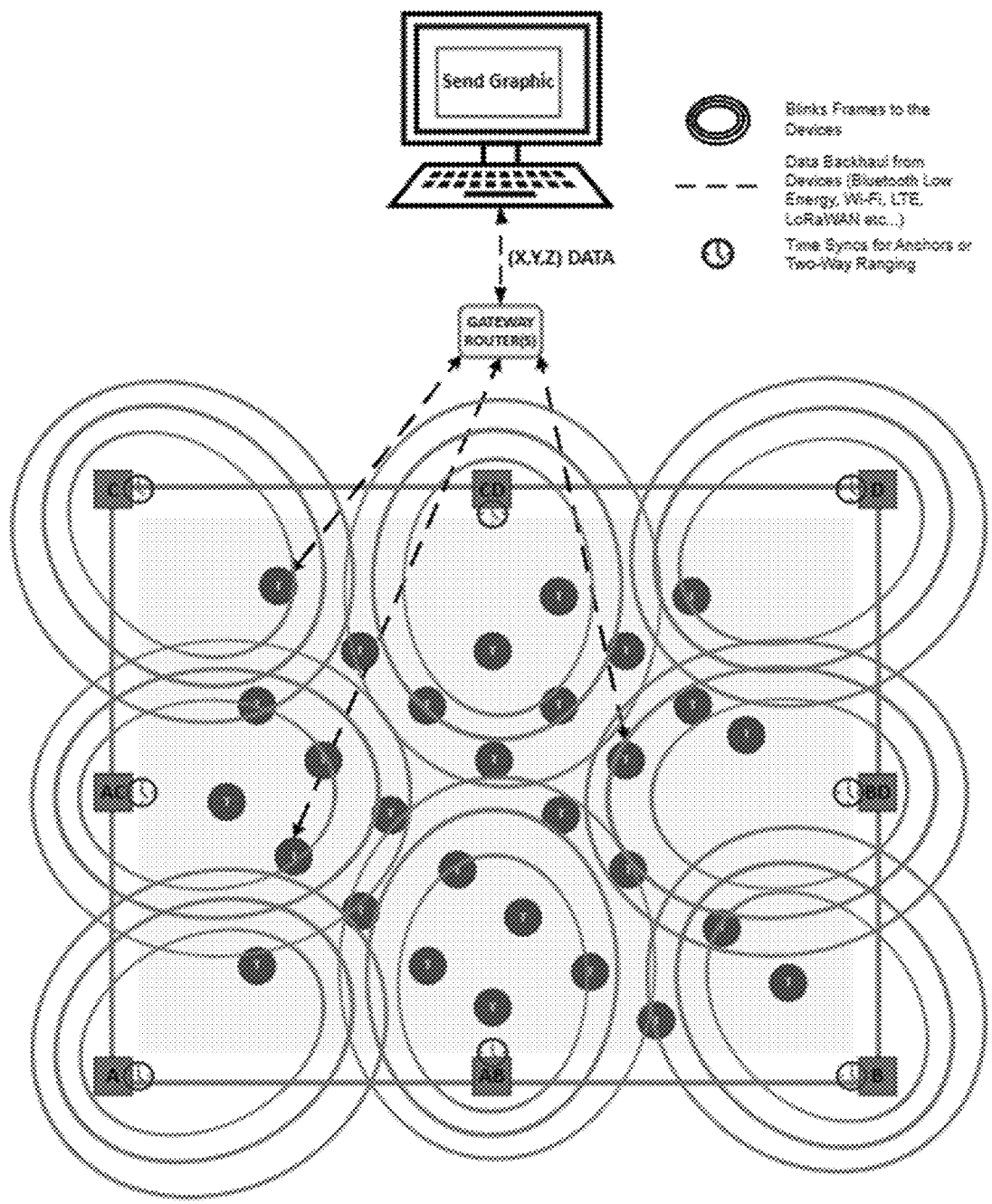
FIGS. 8A-8B (collectively referred to herein as "FIG. 8") provide a series of drawings that are useful for understanding how a location of one or more computing devices can be determined.
Figure 8B:
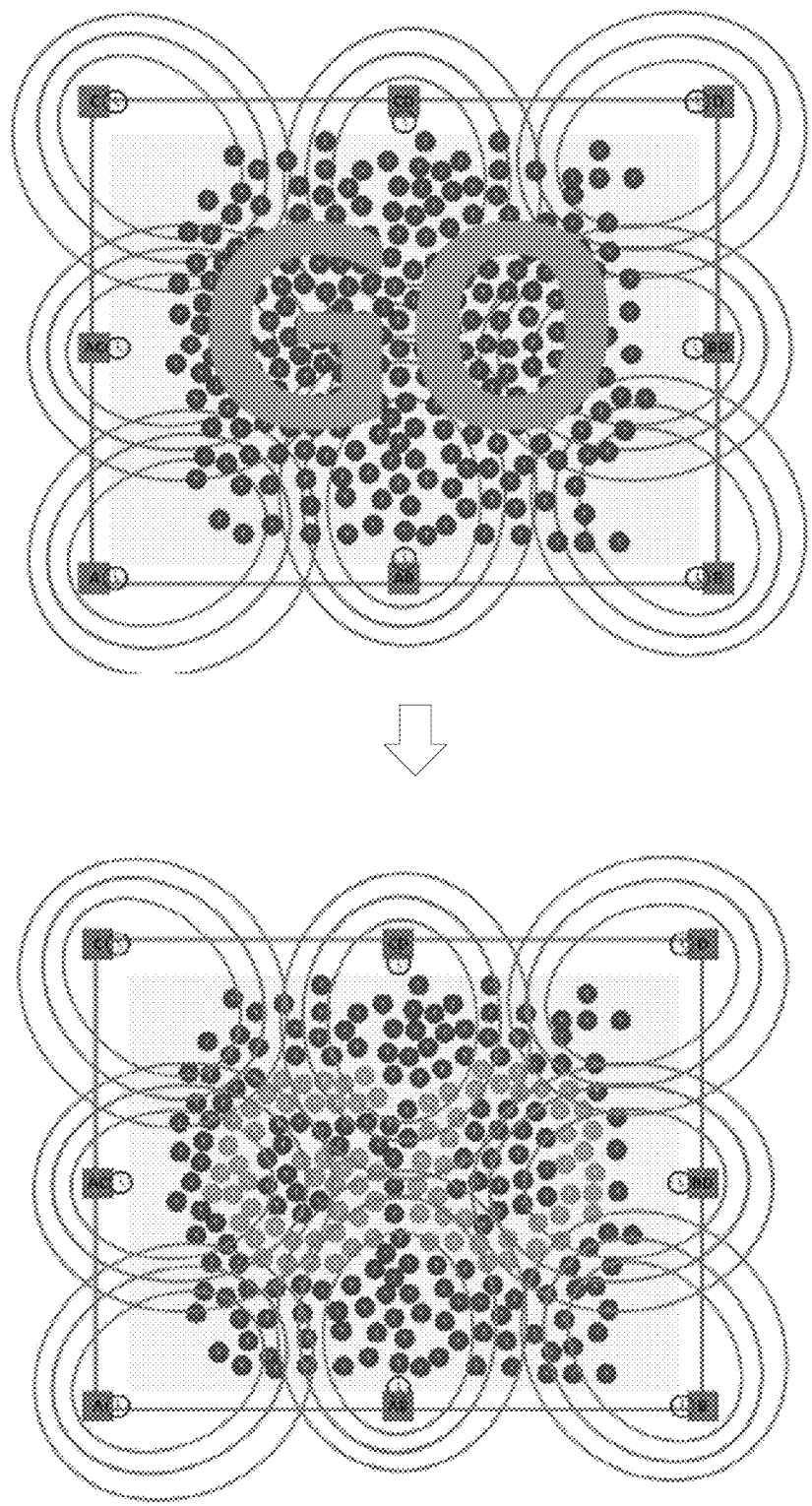

FIG. 8 provides diagram that are useful for understanding one possible implementation of a CU locating system in which LAU(s) (e.g., LAU(s) 114a, 114b, 114c and/or 114d of FIG. 1) communicate with a CU (e.g., ICD 112 of FIG. 1) to facilitate a location determination. An LAU can initiate a poll message and may receive a reply from a CU. The time delay associated with the arrival of the reply can be used by the LAU to determine a distance between the CU and the LAU. A similar process can be used to determine a distance between the CU and another LAU, where the distance between LAUs is known or set. Thereafter, a similar polling and reply process can be implemented with LAUs and CUs. With the information acquired from the three LAUs, the CU can determine its exact location relative to the LAUs. Since the locations of the LAUs are known in advance, the CU can determine its exact location within the system using the formulas such as Heron's formula (Semiperimeter), Pythagorean theorem and/or any other formula selected in accordance with a given application. Heron's formula (Semiperimeter) and/or Pythagorean theorem are well known. Once the locations are known, the CUs can be controlled to display the electronic graphic as shown in FIG. 8B.

Referring now to FIG. 9, there is provided a flow diagram of a method 900 for controlling a display system (e.g., display system 100 of FIG. 1). Method 900 begins at block 902 and continues to block 904 where a comping device (e.g., server 104 of FIG. 1) of the display system detects an occurrence of an event at the venue (e.g., venue 400 of FIG. 4). The detection can be made, for example, based on sensor data received from sensors (e.g., sensors 150 of FIG. 1) and/or other information as described above.

Next in 906, the computing device performs operations to initiate a first display session based on the event being of an event type to trigger a display session. The event type to trigger the display session can include, but is not limited to, points being scored by a team, a song being played by a musician or audio system in the venue, a particular sound being detected within the venue, a particular lighting pattern for a show, and/or a particular word or phrase being spoken by a performer entertaining an audience within the venue.

During the first display session, the computing device performs operations in blocks 908-916 that involve: selecting media content for display by a plurality of ICDs (e.g., ICDs 112 of FIG. 1) (wherein the ICDs are portable devices and located in a plurality of areas (e.g., seating areas 408₁-408ₙ of FIG. 5) or sections (e.g., seating sections 402a-402h of FIG. 4) of the venue; selecting a first area or section from the plurality of areas or sections within the venue at which display of the media content is to begin; identifying first ICDs of the plurality of ICDs that are located in the first area or section which was selected; causing the first ICDs to notify users of a first display time at which the first ICDs are to be moved into positions in which first pixel panels are visible by persons located outside of the first area or section; and causing, at the first display time, each one of the first ICDs to display a respective pixel portion of a first electronic graphic contained in the media content. The respective pixel portions for the first ICDs can be selected based on relative locations of the first ICDs. Upon completing the operations of block 916, an entirety of the first electronic graphic is displayed collectively by the first ICDs.

Method 900 then continues with block 918 where the computing device detects a change in location of at least one of the first ICDs. In response to the detection of the location change, the computing device can: cause the respective pixel portion to no longer be displayed by the at least one of the first ICDs; or cause a different pixel portion of the first electronic graphic to replace the respective pixel portion being displayed by the at least one of the first ICD.

In 920, the computing device controls the ICDs to create a screen floating effect. The screen floating effect can be created by causing the first electronic graphic to appear to move in a given direction (e.g., sequentially or non-sequentially) through the plurality of areas or sections.

Method 900 may additionally comprise performance of the operations of blocks 922-924 by the computing device. These operations involve: identifying second computing devices of the plurality of individual computing devices that are located in a second area or section (which may or may not be adjacent to the first area or section); and causing the second ICDs to notify users of a second display time at which the second ICDs are to be moved into positions in which second pixel panels are visible by persons located outside of the second area or section.

At the second display time, the computing device performs the following operations of blocks 926-928: causing the first computing devices to discontinue display of the first electronic graphic; and causing each one of the second computing devices to display the respective pixel portion of the first electronic graphic contained in the media content or to display respective pixel portions of a second electronic graphic contained in the media content.

Method 900 may additionally comprise performance of the following operations of block 930: detect a change in location of a first ICD; and causing the first ICD to display a different pixel portion of the first electronic graphic while the second ICDs are displaying all other pixel portions of the first electronic graphic. Subsequently, method 900 continues to block 932 where method 900 ends or other operations are performed (e.g., return to 902, end the display session, etc.).

Figure 10:
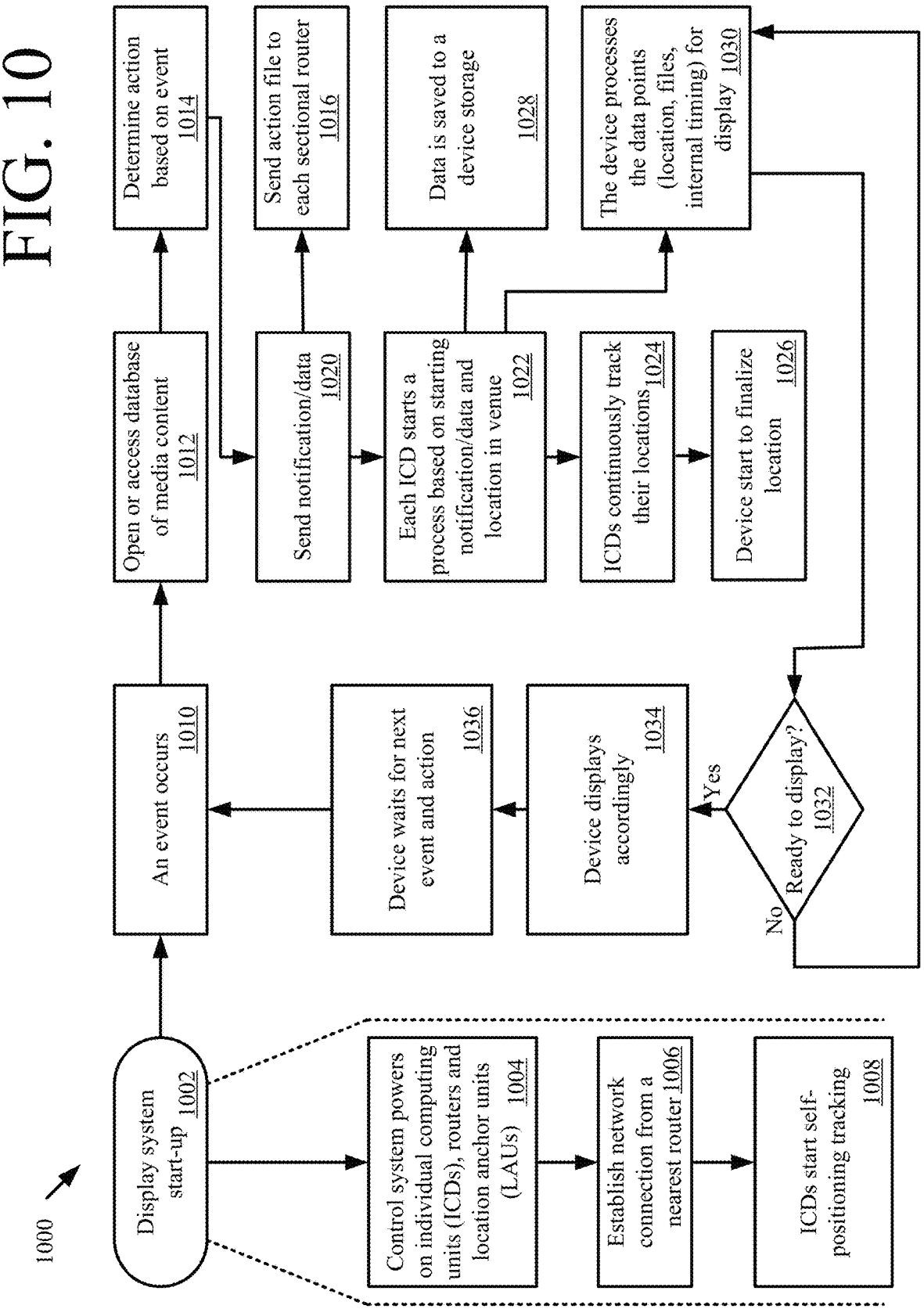
FIG. 10 provides a diagram that is useful for understanding certain operations associated with controlling the display system.

FIG. 10 provides a flow diagram of another method 1000 for operating a display system (e.g., display system 100 of FIG. 1) in accordance with the present solution. Method 1000 begins with 1002 where the display system start-up occurs. The start-up operations can involve operations of blocks 1004-1008 which may be performed by the control system (e.g., control system 102 of FIG. 1). The operations of blocks 1004-1008 involve: powering on the ICDs (e.g., ICDs 112 of FIG. 1), routers (e.g., routers 118 of FIG. 1) and LAUs (e.g., LAUs 114 of FIG. 1); establishing a network connection from a nearest router; and ICDs start self-positioning tracking.

When an event occurs at 1010, the control operator (e.g., individual 110 of FIG. 1) of a server (e.g., server 104 of FIG. 1) can open a datastore (e.g., datastore 106 of FIG. 1) or otherwise access media content (e.g., static images, moving graphics, and/or videos) that are stored in a datastore. The control operator at 1014 will determine action based on event. A notification and/or data is sent in 1020.

An action file (e.g., action file 122 of FIG. 1) is associated with the image content. In some scenarios, the action file can comprise the media content and information specifying how the media content is to be displayed at ICDs located in various sections of the venue (e.g., public venue 400 of FIG. 4). At block 1016, the action file is communicated from the control system to one or more of the sectional routers associated with each section of the venue and distributed to the ICDs. The routers pass the action file to the ICDs.

In 1022, each ICD starts a process based on starting notification/data and its location in the venue. Data is saved to a device storage in 1028. The ICDs continuously track their locations as shown by block 1024. The device start to finalize location in 1026.

At block 1030, the device processes the data points (location, files, internal timing) for display. Method 1000 then continues to decision block 1032. At block 1032, a decision is made as to whether the device is ready for display.

If so [1032:NO], then method 1000 returns to 1030. If so [1032:YES], then the ICD(s) will display(s) accordingly as shown by block 1034. At 1036, the device waits for the next event and action.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for controlling a display system, comprising: detecting an occurrence of an event at a venue; initiating a first display session based on the event being of an event type to trigger a display session; performing the following operations during the first display session: selecting media content for display by a plurality of individual computing devices, wherein the individual computing devices are portable devices and located in a plurality of areas or sections of the venue; selecting a first area or section from the plurality of areas or sections within the venue at which display of the media content is to begin; identifying first computing devices of the plurality of individual computing devices that are located in the first area or section which was selected; causing the first computing devices to notify users that the first computing devices are to be moved into positions in which first pixel panels are visible by persons located outside of the first area or section; and causing, at a first display time, each one of the first computing devices to display a respective pixel portion of a first electronic graphic contained in the media content, whereby an entirety of the first electronic graphic is displayed collectively by the first computing devices; identifying second computing devices of the plurality of individual computing devices that are located in a second area or section; causing the second computing devices to notify users that the second computing devices are to be moved into positions in which second pixel panels are visible by persons located outside of the second area or section; and at a second display time, performing the following operations: causing the first computing devices to discontinue display of the first electronic graphic; and causing each one of the second computing devices to display the respective pixel portion of the first electronic graphic contained in the media content or to display respective pixel portions of a second electronic graphic contained in the media content.

2. The method according to claim 1, wherein the event type to trigger the display session comprises points being scored by a team, a song being played by a musician or audio system in the venue, a particular sound being detected within the venue, a particular lighting pattern for a show, or a particular word or phrase being spoken by a performer entertaining an audience within the venue.

3. The method according to claim 1, further comprising selecting which pixel portion of the first electronic graphic is to be displayed by each of said first computing devices based on relative locations of the first computing devices.

4. The method according to claim 1, further comprising creating a screen floating effect by causing the first electronic graphic to appear to move in a given direction through the plurality of areas or sections.

5. The method according to claim 1, further comprising detecting a change in location of at least one of the first computing devices.

6. The method according to claim 5, further comprising causing a different pixel portion of the first electronic graphic to replace the respective pixel portion being displayed by the at least one of the first computing devices, responsive to detection of the change in location.

7. The method according to claim 5, further comprising causing the respective pixel portion to no longer be displayed by the at least one of the first computing devices, responsive to detection of the change in location.

8. The method according to claim 1, wherein the respective pixel portion comprising a single pixel of the first electronic graphic.

9. A method for controlling a display system, comprising: detecting an occurrence of an event at a venue; initiating a first display session based on the event being of an event type to trigger a display session; performing the following operations during the first display session: selecting media content for display by a plurality of individual computing devices, wherein the individual computing devices are portable devices and located in a plurality of areas or sections of the venue; selecting a first area or section from the plurality of areas or sections within the venue at which display of the media content is to begin; identifying first computing devices of the plurality of individual computing devices that are located in the first area or section which was selected; causing the first computing devices to notify users that the first computing devices are to be moved into positions in which first pixel panels are visible by persons located outside of the first area or section; causing, at a first display time, each one of the first computing devices to display a respective pixel portion of a first electronic graphic contained in the media content, whereby an entirety of the first electronic graphic is displayed collectively by the first computing devices; detecting a change in location of at least one of the first computing devices; causing the respective pixel portion to no longer be displayed by the at least one of the first computing devices, responsive to detection of the change in location; and causing the at least one of the first computing devices to display a different pixel portion of the first electronic graphic while second computing devices of the plurality of individual computing devices are displaying all other pixel portions of the first electronic graphic.

10. A system, comprising: a processor; a non-transitory computer-readable storage medium comprising programming instructions that are configured to cause the processor to implement a method for controlling a display system, wherein the programming instructions comprise instructions to: detect an occurrence of an event at a venue; initiate a first display session based on the event being of an event type to trigger a display session; perform the following operations during the first display session: selecting media content for display by a plurality of individual computing devices, wherein the individual computing devices are portable devices and located in a plurality of areas or sections of the venue; selecting a first area or section from the plurality of areas or sections within the venue at which display of the media content is to begin; identifying first computing devices of the plurality of individual computing devices that are located in the first area or section which was selected; causing the first computing devices to notify users that the first computing devices are to be moved into positions in which first pixel panels are visible by persons located outside of the first area or section; and causing, at a first display time, each one of the first computing devices to display a respective pixel portion of a first electronic graphic contained in the media content, whereby an entirety of the first electronic graphic is displayed collectively by the first computing devices; identify second computing devices of the plurality of individual computing devices that are located in a second area or section; cause the second computing devices to notify users that the second computing devices are to be moved into positions in which second pixel panels are visible by persons located outside of the second area or section; and at a second display time, performing the following operations: causing the first computing devices to discontinue display of the first electronic graphic; and causing each one of the second computing devices to display the respective pixel portion of the first electronic graphic contained in the media content or to display respective pixel portions of a second electronic graphic contained in the media content.

11. The system according to claim 10, wherein the event type to trigger the display session comprises points being scored by a team, a song being played by a musician or audio system in the venue, a particular sound being detected within the venue, a particular lighting pattern for a show, or a particular word or phrase being spoken by a performer entertaining an audience within the venue.

12. The system according to claim 10, wherein the programming instructions further comprising instructions to select which pixel portion of the first electronic graphic is to be displayed be each of said first computing devices based on relative locations of the first computing devices.

13. The system according to claim 10, wherein the programming instructions further comprising instructions to create a screen floating effect by causing the first electronic graphic to appear to move in a given direction through the plurality of areas or sections.

14. The system according to claim 10, wherein the programming instructions further comprising instructions to detect a change in location of at least one of the first computing devices.

15. The system according to claim 14, wherein the programming instructions further comprising instructions to cause a different pixel portion of the first electronic graphic to replace the respective pixel portion being displayed by the at least one of the first computing devices, responsive to detection of the change in location.

16. The system according to claim 14, wherein the programming instructions further comprising instructions to cause the respective pixel portion to no longer be displayed by the at least one of the first computing devices, responsive to detection of the change in location.

17. The system according to claim 10, wherein the respective pixel portion comprising a single pixel of the first electronic graphic.

18. A system, comprising: a processor; a non-transitory computer-readable storage medium comprising programming instructions that are configured to cause the processor to implement a method for controlling a display system, wherein the programming instructions comprise instructions to: detect an occurrence of an event at a venue; initiate a first display session based on the event being of an event type to trigger a display session; perform the following operations during the first display session: selecting media content for display by a plurality of individual computing devices, wherein the individual computing devices are portable devices and located in a plurality of areas or sections of the venue; selecting a first area or section from the plurality of areas or sections within the venue at which display of the media content is to begin; Identifying first computing devices of the plurality of individual computing devices that are located in the first area or section which was selected; causing the first computing devices to notify users that the first computing devices are to be moved into positions in which first pixel panels are visible by persons located outside of the first area or section; and causing, at a first display time, each one of the first computing devices to display a respective pixel portion of a first electronic graphic contained in the media content, whereby an entirety of the first electronic graphic is displayed collectively by the first computing devices detect a change in location of at least one of the first computing devices; cause the respective pixel portion to no longer be displayed by the at least one of the first computing devices, responsive to detection of the change in location; and cause the at least one of the first computing devices to display a different pixel portion of the first electronic graphic while second computing devices of the plurality of individual computing devices are displaying all other pixel portions of the first electronic graphic.

* * * * *